United States Patent [19]
Levy

[11] Patent Number: 6,147,340
[45] Date of Patent: Nov. 14, 2000

[54] FOCAL PLANE READOUT UNIT CELL BACKGROUND SUPPRESSION CIRCUIT AND METHOD

[75] Inventor: Miguel E. Levy, Camarillo, Calif.

[73] Assignee: Raytheon Company, Lexington, Mass.

[21] Appl. No.: 09/163,937

[22] Filed: Sep. 29, 1998

[51] Int. Cl.[7] ..................................................... H01J 40/14
[52] U.S. Cl. .................. 250/214 R; 250/216; 250/208.1; 250/370.08; 348/314
[58] Field of Search ................................ 250/214 R, 216, 250/208.1, 338.1, 370.08; 348/314, 308, 312, 295, 297

[56] References Cited

U.S. PATENT DOCUMENTS

| | | | |
|---|---|---|---|
| 5,128,534 | 7/1992 | Wyles | 250/208.1 |
| 6,040,568 | 3/2000 | Caulfield et al. | 250/208.1 |

Primary Examiner—Que T. Le
Attorney, Agent, or Firm—William C. Schubert; Glenn H. Lenzen, Jr.

[57] ABSTRACT

A background suppression technique uses well-controlled and repeatable charge skimming operations to increase the charge capacities of the integration capacitors of integrated focal plane readout unit cells. A MOSFET (Q1) is connected to an integration capacitor ($C_{int}$) from which the quantity of stored charge is to be reduced. During each photocurrent integration period, the MOSFET is driven with a "skimming pulse" ($V_{sk}$) to draw charge from the capacitor. The skimming pulse is substantially shorter than an integration period, reducing the amount of noise contributed by the MOSFET's noise mechanisms, and has an amplitude great enough to drive the MOSFET into its strong inversion mode, making the quantity of the removed charge relatively insensitive to variations in MOSFET threshold voltage. The charge skimming pulse is arranged to reduce the charge on the capacitor almost, but not quite, to zero, so that the entire integration period remains utilized.

30 Claims, 5 Drawing Sheets

FOCAL PLANE READOUT UNIT CELL BACKGROUND SUPPRESSION CIRCUIT AND METHOD

This invention was made with government support under contract No. DASG60-90-C-0128 awarded by the Department of the Army. The Government has certain rights in this invention.

BACKGROUND OF THE INVENTION

1. Field of the Invention

This invention relates to focal plane arrays, and particularly to focal plane readout unit cells.

2. Description of the Related Art

A focal plane array is made from an array of photodetectors that are coupled to respective "readout unit cells". The unit cells integrate the photocurrent produced by their respective photodetectors over a specific integration period, and the integrated currents are multiplexed and amplified to produce a single video output.

The unit cells are typically arranged into an array and integrated together on a common substrate. A capacitor within each unit cell performs the photocurrent integration, which is necessary to reduce the effect of photocurrent shot noise and improve signal-to-noise (S/N) ratio. Integrated capacitors, however, tend to have small capacitance values due to the small surface area typically allotted them. The small integrated capacitors have a very limited charge capacity, and thus may reach maximum charge before the integration period is over. To prevent the loss of signal information, the integration period must be kept short, which increases the effect of photocurrent shot noise and lowers S/N ratio.

The photocurrent output of a photodetector includes an inherent "background" component, with the signal information of interest riding on top of the background component. As such, some of the integrating capacitor's limited charge capacity is consumed by the unwanted background component. This background component is particularly large in the photocurrent produced by infrared-sensitive photodiodes, and the limited capacity of integrated unit cell capacitors is particularly troublesome for infrared focal plane arrays.

Several approaches to circumventing the limited charge capacity problem involve "skimming" some of the charge from the integrating capacitor. That is, some of the charge accumulating on the capacitor during an integration period is removed so that the capacitor can accommodate a higher maximum photocurrent, with the skimmed charge ideally comprising just the unwanted background component. One such approach involves connecting a MOSFET current source to the integrating capacitor. The MOSFET is operated continuously throughout each integration period to bleed off charge from the capacitor. There are several problems with this approach, however: with charge being withdrawn over the full integration period, typically about 8 ms, the MOSFET only need carry a very small current. To prevent the quantity of charge withdrawn from exceeding that due to the background component, the MOSFET must be operated in its weak inversion mode, where the drain current is exponentially related to the effective gate drive—i.e., the gate voltage minus the MOSFET's threshold voltage ($V_{gs}-V_{th}$). However, due to processing variations, there is some variability in the threshold voltages of the focal plane array's charge skimming MOSFETs. Because of the exponential relationship, the threshold variability can cause the amount of charge skimmed to vary widely from cell to cell, rendering the technique virtually unusable. Furthermore, the low MOSFET transconductance and the long charge skimming period serve to increase the amount of noise contributed by each MOSFET.

Another approach is described in U.S. Pat. 5,128,534 to Wyles, et al. Conventionally, one terminal of the integrating capacitor is connected to the photocurrent and the other terminal connected to ground. The Wyles circuit takes the terminal which is normally grounded and connects a ramping voltage to it instead. This voltage is ramped up for the duration of the integration period, reducing the voltage across the capacitor and allowing a greater amount of photocurrent to be integrated.

The Wyles approach suffers from several drawbacks. The integrating capacitors must be able to operate with both plates electrically accessible, so that the voltage ramp can be applied. This effectively excludes the use of r a MOSFET configured as an inversion capacitor, since the ramp voltage can bias the MOSFET below its threshold voltage. A capacitor made from two polysilicon layers above the substrate can be employed, but the thick oxide dielectric layer required by this type of capacitor lowers its capacitance per unit area. The preferred capacitor implementation for Wyles' circuit uses a gate electrode and a substrate diffusion as plates, with gate oxide as a dielectric, but fabricating such a capacitor requires special processing and significantly reduces yield.

SUMMARY OF THE INVENTION

A background suppression circuit and method are presented, suitable for use with a focal plane readout unit cell, which solve many of the problems noted above. A charge skimming operation having a duration much shorter than an integration period reduces the quantity of charge stored on an integrating capacitor by a highly predictable amount. No special fabrication processes are required, and very little noise is introduced.

A transistor, preferably a MOSFET, is connected to an integration capacitor from which charge is to be removed. During each integration period, the MOSFET's gate is driven with at least one "skimming pulse", which briefly turns on the transistor. While on, the MOSFET provides a conductive path between the capacitor and a current sink through which stored charge is removed from the capacitor. The skimming pulse has two unique characteristics: 1) it is of short duration—significantly shorter than an integration period—which reduces the amount of noise contributed by the MOSFET's noise mechanisms; and 2) it has an amplitude great enough to drive the MOSFET into its strong inversion mode, which makes the quantity of removed charge relatively insensitive to variations in threshold voltage.

The background suppression circuit and method described herein do not require access to both capacitor terminals, and thus allow the use of MOSFETs as inversion capacitors. The charge skimming MOSFETs can be used to serve multiple purposes: with appropriate driving circuitry, each MOSFET can sequentially reset its respective integrating capacitor to an initial known state, skim a fixed amount of charge from the capacitor during each integration period, and read out the charge on the capacitor at the end of the integration period.

The charge skimming pulse is preferably timed to be applied just as the capacitor nears its maximum charge capacity, and is arranged to reduce the charge on the capacitor almost, but not quite, to zero—so that the entire integration period remains utilized.

Variations described herein include applying more than one skimming pulse per integration period to enable additional charge can be skimmed, and skimming while briefly interrupting integration to reduce noise that might otherwise be coupled into the signal path.

Further features and advantages of the invention will be apparent to those skilled in the art from the following detailed description, taken together with accompanying drawings.

DETAILED DESCRIPTION OF THE INVENTION

Figure 1:
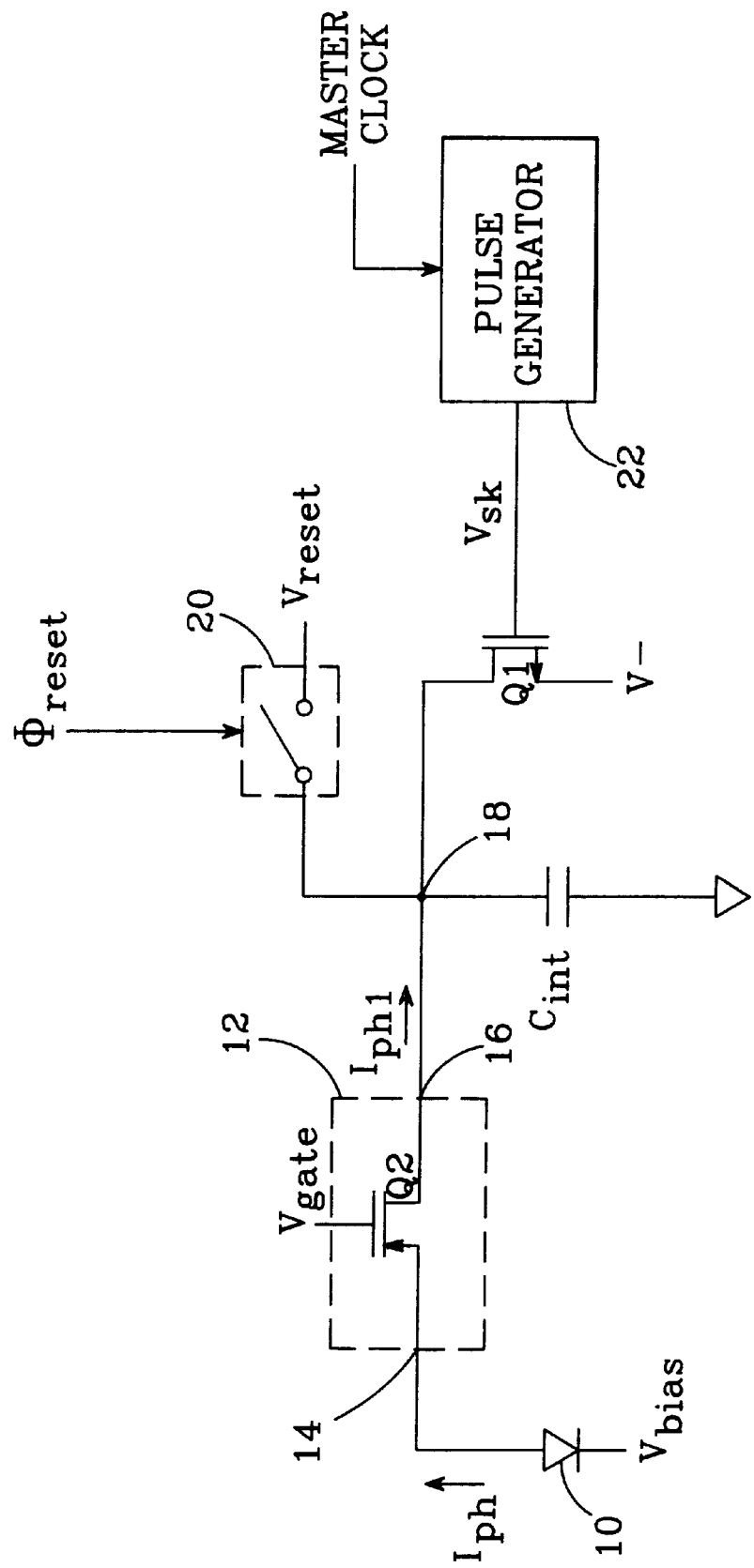
FIG. 1 is a schematic diagram of a background suppression circuit per the present invention.

A background suppression circuit suitable for use with a focal plane readout unit cell is shown in FIG. 1. A photodetector 10, typically a photodiode, has its cathode connected to a DC bias voltage $V_{bias}$. When light to which it is sensitive impinges on the photodetector, it produces a DC photocurrent $I_{ph}$ at its anode. The photocurrent $I_{ph}$ is preferably buffered with a detector interface circuit 12, which preferably presents a low impedance to the photocurrent at its input 14, and produces a signal $I_{ph1}$ representing photocurrent $I_{ph}$ at a high impedance output 16.

A capacitor $C_{int}$ receives current $I_{ph1}$ at a terminal 18, with the capacitor's other terminal tied to a fixed voltage, typically ground. Also connected to terminal 18 is a reset switch 20, which is closed to set the voltage on $C_{int}$ to an initial value $V_{reset}$. For a positive photocurrent, $V_{reset}$ is preferably set to the most negative power supply voltage available. Switch 20 is typically controlled with a logic signal $\phi_{reset}$. $C_{int}$ and detector interface circuit 12 make up part of a "unit cell", a number of which are arranged in an array to form an imaging device.

In practice, the capacitor $C_{int}$ is first set to $V_{reset}$. Switch 20 is then opened to begin an "integration period", during which incoming current $I_{ph1}$ causes a charge $q_{cap}$ to build up on $C_{int}$; i.e., $C_{int}$ performs an integration on current $I_{ph1}$ by converting it to charge $q_{cap}$. An integration period ends when the flow of photocurrent to $C_{int}$ stopped. At the end of an integration period, the charges stored on $C_{int}$ and on the other capacitors in the array are read out and multiplexed together to create a video frame.

The photocurrent is integrated over time to reduce the effect of photocurrent shot noise, with longer integration periods providing more noise reduction than shorter ones. A problem arises, however, due to the physical constraints placed on the size of the capacitor $C_{int}$. Focal plane array unit cells are preferably integrated, and the amount of wafer surface area allotted to capacitors is typically limited. The resulting small capacitors have a correspondingly small maximum charge capacity $q_{limit}$. If $q_{cap}$ reaches $q_{limit}$ before the end of an integration period, any current $I_{ph}$ coming to $C_{int}$ after $q_{limit}$ is exceeded is not integrated, and its signal information is lost. Thus, unless otherwise countered, the constraints on $C_{int}$ generally force integration periods to be shorter than would be preferred for purposes of shot noise reduction.

Figure 2A:
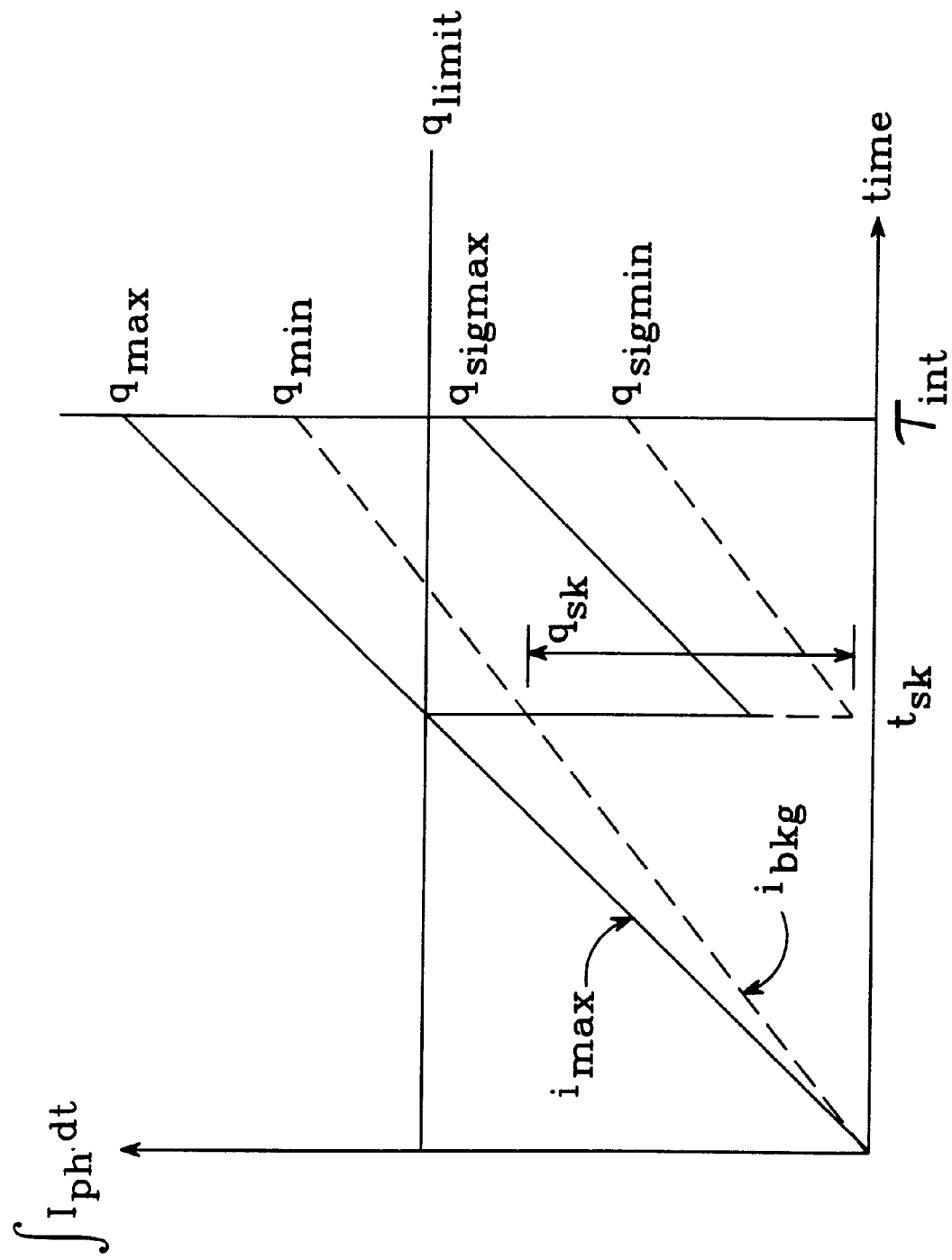
FIG. 2a is a graph plotting charge storage versus time when charge skimming is performed per the present invention.

The graph in FIG. 2a plots the integrated photocurrent $\int I_{ph} \cdot dt$ (charge) stored on an integrating capacitor with respect to time. The photocurrent $I_{ph}$ generated by photodetector 10 includes a significant "background" component, labeled $i_{bkg}$, on top of which rides the signal of interest. The current labeled $i_{max}$ includes both background and signal components, and represents the maximum current that can be generated. The background component is integrated along with the signal of interest and consumes some of the integrating capacitor's charge capacity. The graph covers one integration period, labeled $\tau_{int}$. If the integrating capacitor had sufficient capacity, integrating $i_{max}$ and $i_{bkg}$ over one entire integration period would result in a stored charge of between $q_{max}$ and $q_{min}$.

An integrating capacitor's charge capacity is limited, however. As seen in FIG. 2a, the maximum charge capacity $q_{limit}$ of the capacitor can potentially be reached at a time $t_{sk}$, prior to the end of integration period $\tau_{int}$. When this occurs, photocurrent received at the capacitor between $t_{sk}$ and $\tau_{int}$ is not integrated, and the signal information contained therein is lost. The invention solves this problem by "skimming" some of the charge from the capacitor during the integration period, i.e., reducing the quantity of charge stored on the capacitor, to prevent $q_{limit}$ from being reached prior to the end of the integration period and thus allowing more photocurrent to be integrated than could otherwise be accommodated. Ideally, a precisely known amount of charge is removed each time a skim is performed, without introducing any noise into the signal path. In FIG. 2a, charge is skimmed at time $t_{sk}$, with a quantity of charge $q_{sk}$ being removed. Charge quantity $q_{sk}$ is preferably equal to that amount of charge reduction that will reduce $i_{bkg}$ almost, but not quite, to zero. Current $i_{bkg}$ is preferably not reduced to zero to insure that the integrated background noise is retained; if reduced to zero, the effective integration time for $i_{bkg}$ is reduced to $\tau_{int} - t_{sk}$, which would result in a higher shot noise level. Once charge $q_{sk}$ has been removed, integration of the photocurrent can continue over the entire integration period without the capacitor's charge capacity $q_{limit}$ being reached, with the amount of charge stored on Cift at time $\tau_{int}$ being between $q_{sigmin}$ and $q_{sigmax}$.

Implementing the invention as described herein nearly achieves the ideal charge skimming performance noted above. Referring back to FIG. 1, a transistor Q1, preferably a MOSFET, is connected as a controlled current source between integrating capacitor terminal 18 and a current sink terminal at a voltage V−, which can include ground. To perform a charge skim operation, a "charge skimming pulse" $V_{sk}$ is applied to Q1's control input. The pulse briefly turns Q1 on, providing a conductive path between $C_{int}$ and V− through which a controlled amount of charge stored on $C_{int}$ is removed and dumped to the current sink.

To fully realize the invention's advantages, charge-skimming pulse $V_{sk}$ is required to have particular characteristics. Due to manufacturing processing variations, some variation will be found between the respective threshold voltages of an array of integrated MOSFETs such as those used to perform the charge-skimming. These $V_{th}$ variations affect the amount of charge removed from an integrating capacitor for a given skimming pulse. To minimize the impact of $V_{th}$ variations, MOSFET Q1 is made to operate in its strong inversion mode. In strong inversion, Q1's drain current is proportional to $(V_{gs}-V_{th})^2$ rather than the exponential relationship present when operated in weak inversion, making the quantity of removed charge relatively insensitive to variations in threshold voltage. This is accomplished by supplying a skimming pulse $V_{sk}$ with an amplitude sufficient to drive Q1 into strong inversion.

With Q1 in strong inversion, all of the charge on $C_{int}$ can be quickly removed. But as noted above, it is preferable that the charge removed ($q_{sk}$) not reduce the charge on $C_{int}$ to zero. This is prevented by making the skimming pulse $V_{sk}$ substantially shorter than an integration period. A short skimming pulse limits the amount of charge removed, and also reduces the amount of noise contributed by Q1's noise mechanisms. Thus, a skimming pulse having a duration substantially shorter than an integration period and an amplitude sufficient to drive a MOSFET into strong inversion is applied to Q1, and a highly predictable amount of charge $q_{sk}$ is thereby removed from $C_{int}$.

Because the charge removed $q_{sk}$ by Q1 is ideally just that developed by the background component of photocurrent $i_{ph}$, Q1 as driven by the skimming pulse $V_{sk}$ described above is referred to as a "background suppression circuit". Though useful with all focal plane readout unit cells which employ integrating capacitors, this circuit is particularly beneficial when the photodetector 10 driving the unit cell is an infrared-sensitive photodiode, which tend to generate photocurrent with a high background component.

A detector interface circuit such as interface circuit 12 preferably serves as a buffer between the output of a photodetector such as photodetector 10 and an integrating capacitor such as $C_{int}$. The interface circuit 12 buffers the photodetector 10 from the large voltage swings which occur on the integrating capacitor during integration by preferably presenting a low impedance to the incoming photocurrent and having a high impedance output. Detector interface circuit 12 is typically either a direct injection circuit or a feedback-enhanced direct injection circuit (FEDI). An example of a direct injection circuit is shown in FIG. 1, in which a common-gate MOSFET Q2 is used as interface circuit 12. A voltage $V_{gate}$ applied to the gate of Q2 biases the photodetector 10 during an integration period, then is made more positive to turn Q2 off and stop the flow of photocurrent at the end of the integration period.

To remove a predictable amount of charge, the amplitude and duration of $V_{sk}$ are critical. The proper values for these skimming pulse characteristics will be particular to a specific system design, and are dependent on several factors. For example, the characteristics of the scene being detected and the photodetector's leakage characteristics should be considered. The characteristics of the charge skimming transistors must also be known, because the amount of charge skimmed is largely determined by the effective gate drive ($V_{gs}-V_{th}$) applied to them. The he expected variability in $V_{th}$ for the skimming transistors in an array should be determined or estimated for the fabrication process being used. The amount of variability in the charge skimming process which can be tolerated should also be ascertained. This leads to a minimum value of effective gate drive and to suitable dimensions for the charge-skimming transistors that, when followed, reduce the variability in $q_{sk}$ to an acceptable value. A charge-skimming MOSFET that is long and narrow is preferred: because a higher voltage is required to drive it into strong inversion, such a device is less sensitive to $V_{th}$ variability.

Skimming pulse $V_{sk}$ is produced by a pulse generator circuit 22, arranged to generate pulses having the amplitude and duration characteristics required by a particular imaging system, as discussed above. The pulses are preferably derived from a master clock signal which is typically generated on the same chip that contains the unit cells, using conventional means that are well-understood in the art.

Figure 2B:
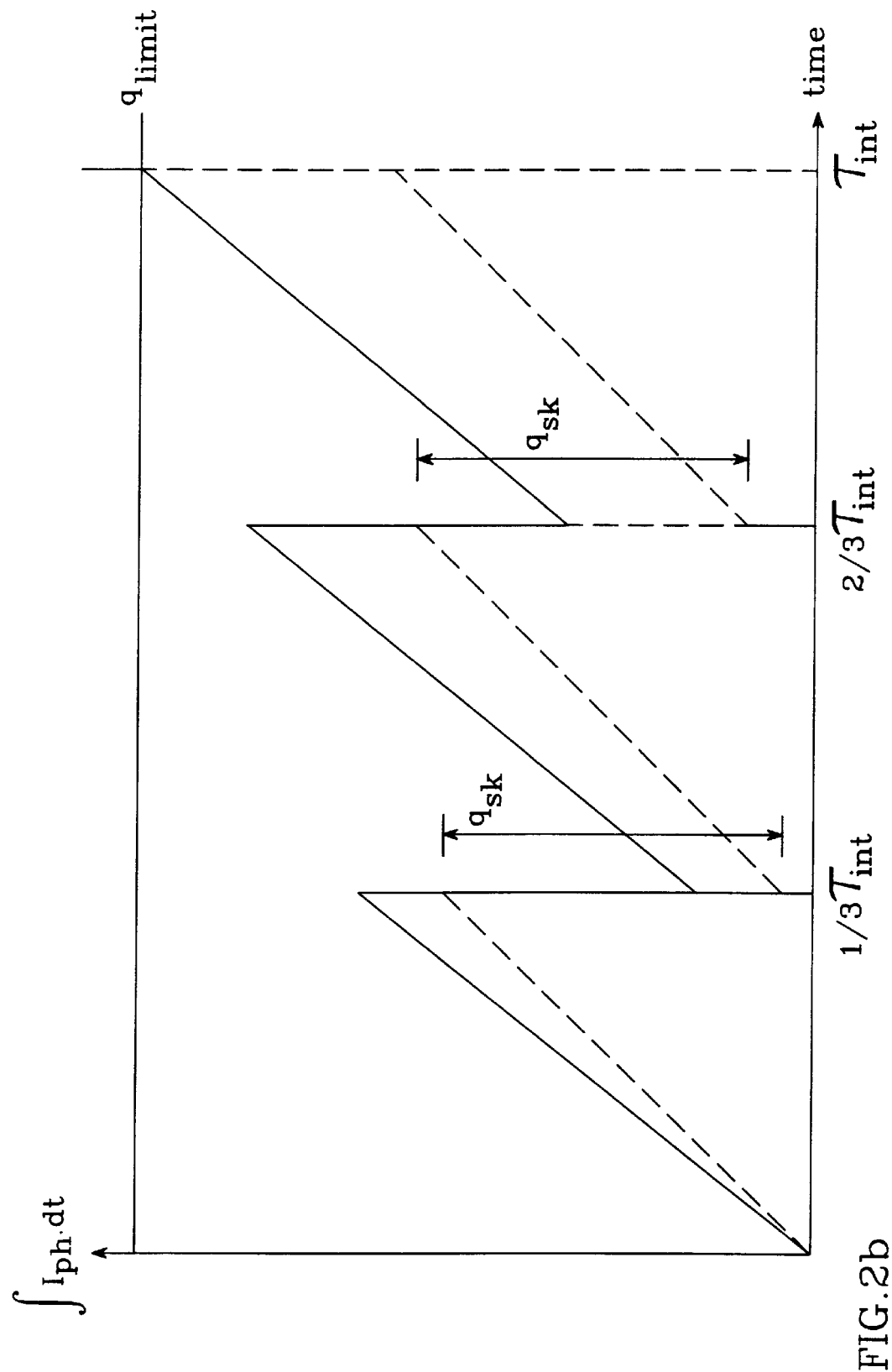
FIG. 2b is a graph plotting charge storage versus time when two charge skimming events are performed per integration period.

The invention contemplates a least one skimming pulse per integration period. For a single skimming event per integration period, the skimming pulse $V_{sk}$ preferably occurs when the stored charge is about at the capacitor's charge capacity limit $q_{limit}$, which generally occurs at about the middle of the integration period $\tau_{int}$. The background suppression circuit can be arranged to remove even more charge per period by performing more than one skim per period, though additional charge-skimming events are likely to couple more noise into the unit cell's signal path than would a single event. When employing two skimming events per period, the pulses preferably occur at approximately ⅓ and ⅔ of $\tau_{int}$. A graph depicting the use of two skimming events, occurring at times ⅓·$\tau_{int}$ and ⅔·$\tau_{int}$, respectively, each of which removes a quantity of charge $q_{sk}$, is shown in FIG. 2b. For a system with a variable integration time, the choice of when and how many times to do the charge skimming is part of the overall system design. The invention also contemplates the possibility of briefly interrupting an integration to perform a charge skimming operation, which could reduce the possibility of introducing noise via the coupling of the skimming pulse into the signal path.

Integrating capacitor $C_{int}$ is typically connected between terminal 18 and ground, so that only one of its terminals need be accessible. This allows $C_{int}$ to be implemented with a MOSFET used as an inversion capacitor. Alternatively, a conventional capacitor such as a MOS capacitor can be used.

Figure 3:
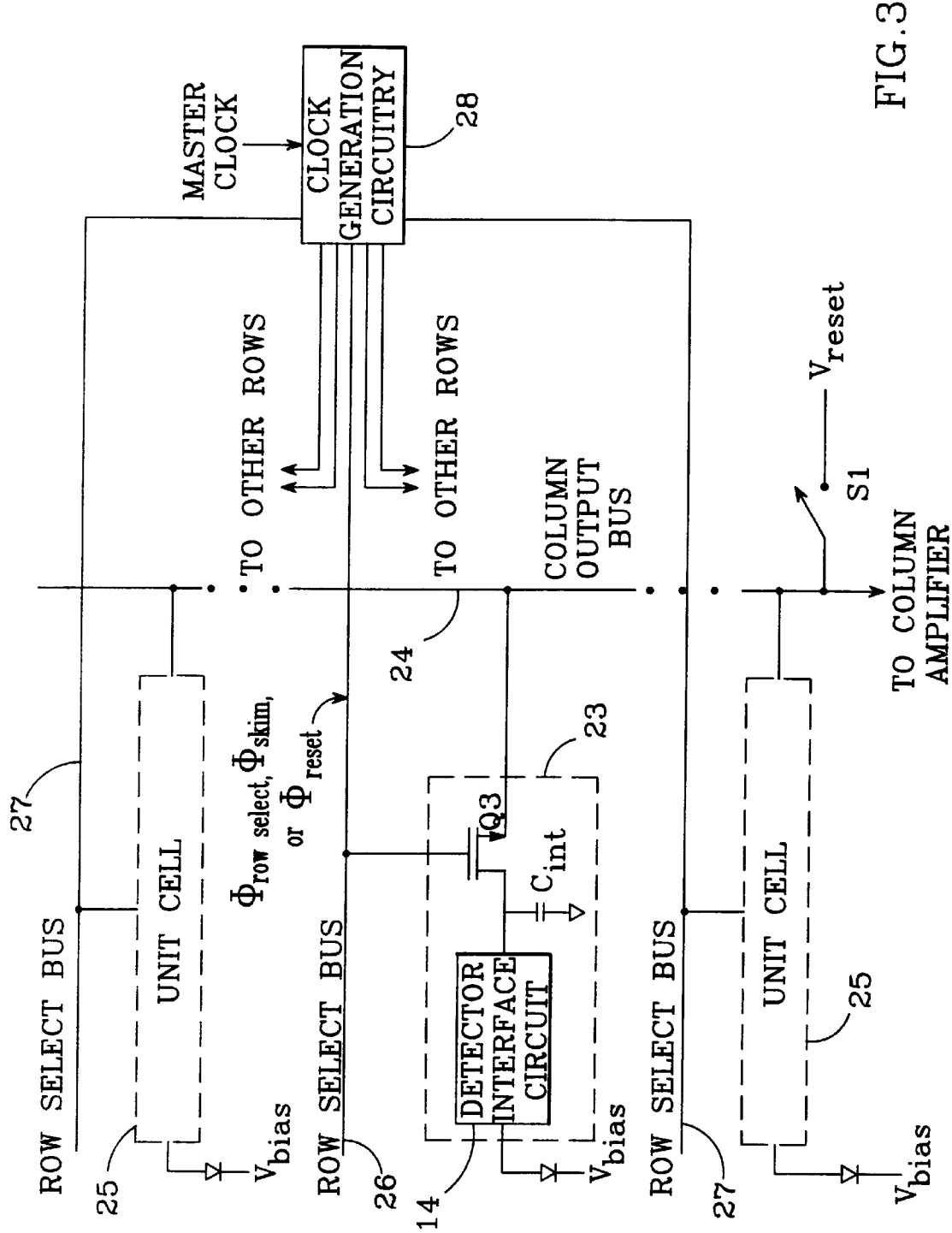
FIG. 3 is a schematic diagram illustrating the use of a charge-skimming transistor per the present invention to perform additional functions.

A unit cell per the present invention can be configured such that its charge-skimming MOSFET performs capacitor reset and readout functions in addition to its charge-skimming duties. The schematic diagram of FIG. 3 shows one such unit cell 23 from a row and column array of unit cells. The drain of a FET Q3 is connected to the integrating capacitor $C_{int}$, and its source is connected to a column output bus 24 which it shares with all other unit cells 25 in the same column. Q3's gate is connected to a row select bus 26, with other rows of unit cells connected to respective row select buses 27. A switch S1 is connected between the column output bus and voltage $V_{reset}$.

Q3 is used to reset the voltage on $C_{int}$ as follows: switch S1 is closed and row select bus 26 is pulsed with a signal $\phi_{reset}$. This turns Q3 on and connects $C_{int}$ to $V_{reset}$. The amplitude and duration of $\phi_{reset}$ are not critical as long as Q3 turns on fully and all the integrating capacitors in the array are preset to $V_{reset}$.

Q3 is used to perform a skimming operation by closing S1 during the integration period and pulsing row select bus 26 with a signal $\phi_{skim}$, which is analogous to the $V_{sk}$ skimming pulse discussed above. As stated above, the timing, amplitude and duration of $\phi_{skim}$ are critical to the skimming operation.

Q3 is used to readout the charge on $C_{int}$ by pulsing row select bus 26 with a signal $\phi_{rowselect}$ with switch S1 open. This transfers the charge on $C_{int}$ to the column output bus 24, and eventually to a column amplifier (not shown). The amplitude of $\phi_{rowselect}$ is not critical as long as Q3 turns on fully. The duration of $\phi_{rowselect}$ is also not critical as long as it is sufficient to allow the column amplifier to settle adequately.

Clock generation circuitry 28 generates signals $\phi_{reset}$, $\phi_{skim}$, and $\phi_{rowselect}$, which are preferably derived from a master clock signal by means well-understood in the art.

Figure 4:
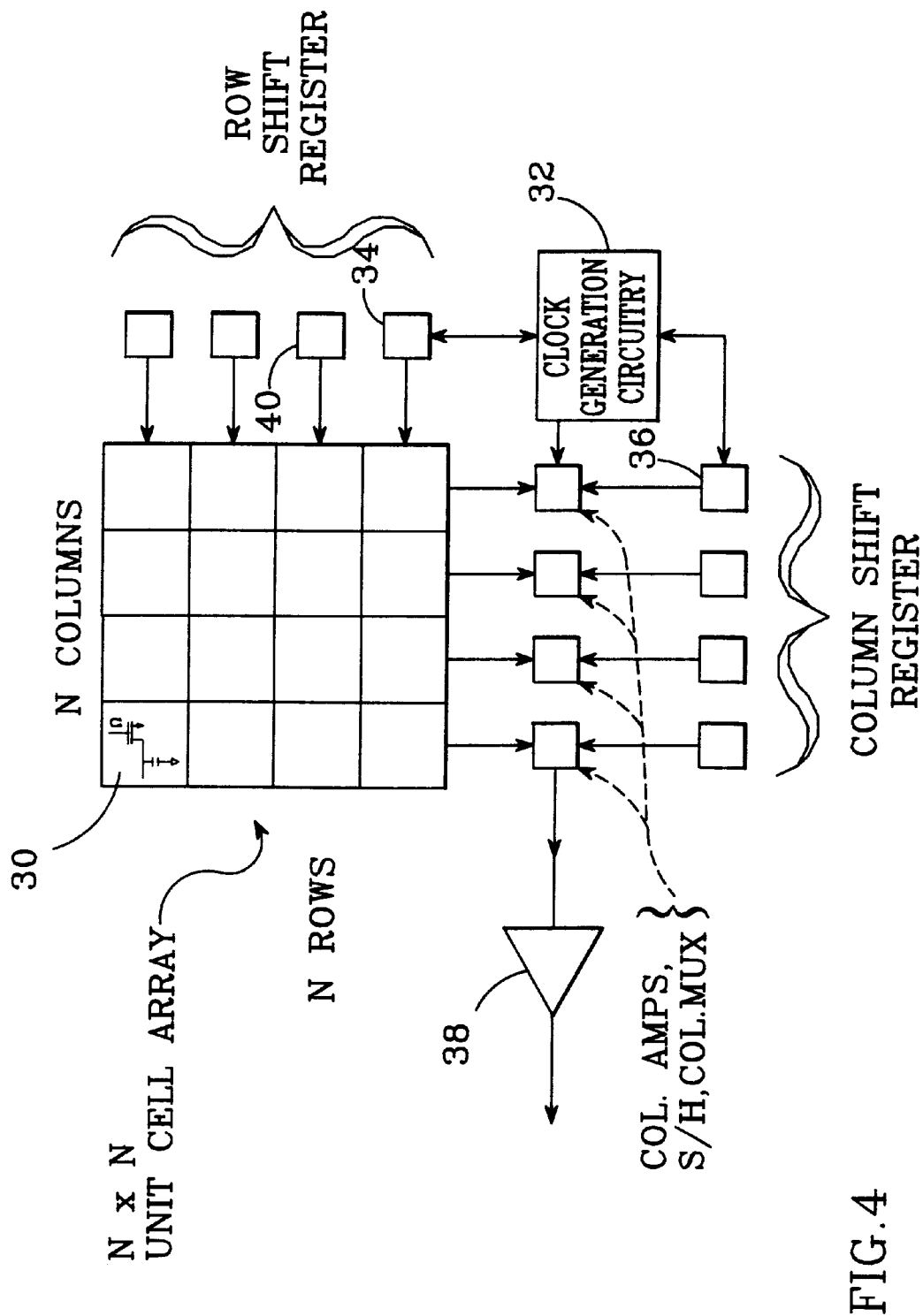
FIG. 4 is a block diagram of an N×N array of unit cells which each include a background suppression circuit per the present invention.

A number of unit cells per the present invention can be assembled into an N×N array to form an imaging chip; the typical architecture of such a chip is shown in FIG. 4. Each unit cell 30 in the array is as described above; i.e., with a charge-skimming FET driven by a charge-skimming pulse having a period substantially shorter than an integration period and an amplitude sufficient to operate the FET in its strong inversion mode. The configuration shown forms a "staring" array in which image data is read out one row at a time, with the outputs of the N unit cells in a row being multiplexed out to a linear array of N column amplifiers and sample and hold circuits.

In operation, three sequential timing periods are required for each video frame: the unit cell reset time, the photocurrent integration time, and the data readout time. The unit cell reset time occurs at the beginning of the video frame, during which the integrating capacitors in all N×N unit cells are set to the $V_{reset}$. The photocurrent integration period is then started, typically by either opening the switch that connects the integrating capacitor to $V_{reset}$, or by setting the gate voltage $V_{gate}$ on detector interface transistor Q2 to permit photocurrent to pass through to the capacitor. Manipulation of $V_{gate}$ is also commonly used to terminate the integration period.

Data readout is performed immediately following the integration period. Clock generation circuitry 32 inserts a logic "one" into the first stage 34 of a row shift register, and another "one" is inserted into the first stage 36 of a column shift register. This "one" causes the signals stored on the integrating capacitors of the first row of unit cells to be transferred simultaneously to an array of N column amplifiers/sample and hold circuits/multiplexers. The clock generation circuitry 32 then shifts the "one" down the N stages of the column shift register, causing the signal voltages on the sample and hold circuits to be sequentially read into an output driver 38.

After data in the first row of unit cells has been read out, the clock generation circuitry 32 shifts the "one" in the row shift register to the second stage 40, and the row data readout sequence is repeated for the second row. This sequence of events continues until the Nth row is read out.

Only MOSFETs have been discussed herein to perform the invention's charge-skimming operation, but the invention is not limited to this type of transistor. Other types of transistors, including JFETs, MESFETs, and bipolar transistors could also be employed—it is only necessary that the device be able to turn on and provide a well-controlled conductive path when driven with a given skimming pulse. However, focal plane arrays are typically operated at very low temperatures at which bipolar transistors perform poorly.

While particular embodiments of the invention have been shown and described, numerous variations and alternate embodiments will occur to those skilled in the art. Accordingly, it is intended that the invention be limited only in terms of the appended claims.

I claim:

1. A background suppression circuit suitable for use with a focal plane readout unit cell, comprising:
   an integrating capacitor arranged to receive a first current for a predetermined integration period and to store the charge developed from said first current, said capacitor having a maximum charge capacity,
   a transistor having a current circuit connected to said capacitor and a control input connected to receive a skimming pulse at least once per integration period, said transistor reducing the quantity of charge stored on said capacitor when said skimming pulse is received, and
   a pulse generation circuit arranged to generate at least one of said skimming pulses per integration period, said at least one skimming pulse having a duration substantially shorter than said integration period and an amplitude sufficient to turn said transistor on,
   said reduction of stored charge enabling an increased quantity of said first current to be integrated during said integration period when said first current would otherwise exceed the charge capacity of said capacitor.

2. The background suppression circuit of claim 1, wherein said transistor is a field-effect transistor (FET), said FET driven into its strong inversion mode when receiving said skimming pulse to reduce said suppression circuit's sensitivity to threshold voltage manufacturing variations.

3. The background suppression circuit of claim 1, wherein said capacitor, transistor, and pulse generating circuit are integrated together on a common substrate.

4. A background suppression circuit suitable for use with an integrated focal plane readout unit cell, comprising:

an integrating capacitor arranged to receive a first current representing a photocurrent for a predetermined integration period and to store the charge developed from said first current, said capacitor having a maximum charge capacity, a field-effect transistor (FET) having a current circuit connected to said capacitor and a control input connected to receive a skimming pulse at least once per integration period, said FET operating as a controlled current source which reduces the quantity of charge stored on said capacitor by a controlled amount when said skimming pulse is received, and a pulse generation circuit arranged to generate at least one of said skimming pulses per integration period, said at least one skimming pulse having a duration substantially shorter than said integration period and an amplitude sufficient to drive said FET into its strong inversion mode, said capacitor, FET and pulse generation circuit integrated together on a common substrate, said reduction of stored charge enabling an increased quantity of photocurrent to be integrated during said integration period when said photocurrent would otherwise exceed the charge capacity of said capacitor.

5. The background suppression circuit of claim 4, wherein said FET and said pulse generation circuit are arranged such that the quantity of charge stored on said capacitor is reduced to nearly zero when said FET receives said skimming pulse.

6. The background suppression circuit of claim 4, wherein said pulse generation circuit is arranged to generate said skimming pulse at about the middle of said integration period.

7. The background suppression circuit of claim 4, wherein said pulse generation circuit is arranged to generate said skimming pulse as the charge on said capacitor about reaches said maximum charge capacity.

8. The background suppression circuit of claim 4, wherein said pulse generation circuit is arranged to generate two or more skimming pulses per each integration period.

9. The background suppression circuit of claim 8, wherein said pulse generation circuit is arranged to generate a first skimming pulse after about ⅓ of said integration period has transpired and a second skimming pulse after about ⅔ of the integration period has transpired.

10. The background suppression circuit of claim 4, wherein said FET is arranged such that the gate voltage required to drive it into strong inversion is significantly higher than its threshold voltage to reduce said suppression circuit's sensitivity to threshold voltage manufacturing variations.

11. The background suppression circuit of claim 4, further comprising a photodetector arranged to output a photocurrent from which said first current is derived.

12. The background suppression circuit of claim 11, further comprising a photodetector interface circuit connected to receive said photocurrent at an input and to produce said first current at an output.

13. The background suppression circuit of claim 12, wherein said photodetector interface circuit comprises a MOSFET connected in a common-gate configuration with its source connected to said photodetector and its drain connected to said integrating capacitor.

14. The background suppression circuit of claim 11, wherein said photodetector is an infrared-sensitive photodiode.

15. The background suppression circuit of claim 4, wherein said FET is a MOSFET arranged to sequentially reset said integrating capacitor to an initial state, remove a quantity of charge stored on said capacitor, and to readout the charge stored on said capacitor after said integration period has ended.

16. The background suppression circuit of claim 4, wherein said first current represents a photocurrent that includes a background component, said FET and said skimming pulse arranged to remove a quantity of charge from said capacitor nearly equal to the amount of charge developed from said background component.

17. The background suppression circuit of claim 4, wherein said integrating capacitor comprises a MOSFET configured as an inversion capacitor.

18. The background suppression circuit of claim 4, wherein said integrating capacitor comprises a MOS capacitor.

19. A focal plane readout unit cell with a background suppression circuit, comprising:

a photodetector interface circuit connected to receive a photocurrent at an input and to produce a first current at an output, an integrating capacitor arranged to receive said first current for a predetermined integration period and to store the charge developed from said first current, said capacitor having a maximum charge capacity, a field-effect transistor (FET) having a current circuit connected to said capacitor and a control input connected to receive a skimming pulse, said FET operating as a controlled current source which reduces the quantity of charge stored on said capacitor by a controlled amount when said skimming pulse is received, and a pulse generation circuit arranged to generate at least one of said skimming pulses per integration period, said at least one skimming pulse having a duration substantially shorter than said integration period and an amplitude sufficient to drive said FET into its strong inversion mode, said photodetector interface circuit, integrating capacitor, FET and pulse generation circuit integrated together on a common substrate, said reduction of stored charge enabling an increased quantity of photocurrent to be integrated during said integration period when said photocurrent would otherwise exceed the charge capacity of said integrating capacitor.

20. The focal plane readout unit cell of claim 19, further comprising a photodetector arranged to output said photocurrent to said photodetector interface circuit.

21. The focal plane readout unit cell of claim 19, wherein said photocurrent includes a background component and said FET and said skimming pulse are arranged to remove a quantity of charge from said integrating capacitor nearly equal to the amount of charge developed from said background component.

22. An integrated focal plane array with improved background suppression, comprising:

a plurality of focal plane readout unit cells arranged into a row and column array, each unit cell comprising:

a photodetector interface circuit connected to receive a photocurrent at an input and to produce a first current at an output, an integrating capacitor arranged to receive said first current for a predetermined integration period and to store the charge developed from said first current, said capacitor having a maximum charge capacity, and a field-effect transistor (FET) having a current circuit connected to said capacitor and a control input connected to receive a skimming pulse, said FET operating as a controlled current source which reduces the quantity of charge stored on said capacitor by a controlled amount when said skimming pulse is received;

clock generation circuitry arranged to generate at least one of said skimming pulses per integration period for each of said FETs in said array, each skimming pulse having a duration substantially shorter than said integration period and an amplitude sufficient to drive the receiving FET into its strong inversion mode, and a plurality of column multiplexers connected to respective columns of said unit cells for assembling the charges from said array of unit cells into a video frame, said unit cells, clock generation circuitry and column multiplexers integrated together on a common substrate.

23. The focal plane array of claim 22, further comprising a plurality of photodetectors connected to respective focal plane readout unit cells and supplying said photocurrents to said photodetector interface circuits.

24. The focal plane array of claim 23, wherein said photodetectors are infrared-sensitive photodiodes.

25. The focal plane array of claim 22, wherein each of said unit cells' respective FETs is a MOSFET arranged to sequentially reset its unit cell's integrating capacitor to an initial state, remove charge from its unit cell's capacitor during said integration period, and to readout the charge stored on its unit cell's capacitor after said integration period has ended.

26. A method of removing charge from the integrating capacitor of a focal plane readout unit cell to allow said capacitor to accommodate a higher maximum photocurrent, comprising the steps of:

integrating a photocurrent on an integrating capacitor over an integration period, said integrating capacitor having a maximum charge capacity, and drawing current from said capacitor during said integration period to reduce the quantity of charge stored on said capacitor, said current drawn from said capacitor for a period substantially shorter than said integration period, said charge reduction enabling an increased quantity of photocurrent to be integrated during said integration period when said photocurrent would otherwise exceed the charge capacity of said capacitor.

27. The method of claim 26, further comprising the step of applying at least one pulse per integration period to the control input of a transistor having its current circuit connected between said capacitor and a current sink, said transistor operating as a controlled current source, said pulse causing said transistor to turn on and draw current from said capacitor to said current sink.

28. The method of claim 27, wherein said transistor is a MOSFET and said pulse causes said MOSFET to be driven into its strong inversion mode such that the quantity of stored charge removed by said MOSFET is relatively insensitive to variations in said MOSFET's threshold voltage.

29. The method of claim 27, wherein said at least one pulse is a single pulse applied to the control input of said transistor at about the middle of said integration period.

30. The method of claim 27, wherein said photocurrent includes a background component, said transistor and said skimming pulse arranged to remove a quantity of charge from said capacitor nearly equal to the amount of charge developed from said background component.

* * * * *